United States Patent [19]

Hamid

[11] Patent Number: 4,508,133

[45] Date of Patent: Apr. 2, 1985

[54] PROTECTIVE COVER RETAINER

[75] Inventor: Syed Hamid, Duncan, Okla.

[73] Assignee: Halliburton Company, Duncan, Okla.

[21] Appl. No.: 575,633

[22] Filed: Jan. 31, 1984

[51] Int. Cl.³ .................. F16K 13/04; F04B 39/12
[52] U.S. Cl. ............................... 137/68 R; 417/568; 417/53
[58] Field of Search .............. 137/68 R; 417/53, 568; 29/156.4 R

[56] References Cited

U.S. PATENT DOCUMENTS

| 1,765,883 | 6/1930 | Ruschke | 137/68 R |
| 1,959,822 | 5/1934 | Greve | 137/68 R |
| 2,580,426 | 1/1952 | Heigis | 137/68 R |
| 2,599,593 | 6/1952 | Stroop | 137/68 R |
| 3,158,165 | 11/1964 | Benson et al. | 137/68 R |
| 4,426,109 | 1/1984 | Fike, Jr. | 137/68 R |

FOREIGN PATENT DOCUMENTS 651017  3/1951  United Kingdom .............. 137/68 R

Primary Examiner—William L. Freeh
Attorney, Agent, or Firm—Joseph A. Walkowski; Thomas R. Weaver

[57] ABSTRACT

A protective cover comprises a substantially circular cover including a center shear disc surrounded by an annular outer portion, mounted in the fluid end of a plunger-type high pressure pump. The cover is held in place by the retainer assembly of the present invention, which is secured to the fluid end. When subjected to a compressive load by the plunger in excess of a predetermined limit, the shear disc shears from the outer portion along an arcuate boundary of reduced wall thickness between the shear disc and outer portions and the sheared disc is propelled by the pressure into the retainer assembly, striking a plug which in turn forces an impact disc into the end of the retainer, which includes a substantially circular recess therein of lesser diameter than the impact disc. The impact disc is thus sheared as the inner portion thereof enters the retainer recess, the energy from the shear disc being thereby substantially dissipated without harm to the retainer.

9 Claims, 3 Drawing Figures

PROTECTIVE COVER RETAINER

BACKGROUND OF THE INVENTION

It is common practice in the petroleum industry to employ high-pressure plunger-type pumps in a variety of field operations relating to oil and gas wells, such as cementing, acidizing, fracturing, and others. An example of such a high pressure pump is the Halliburton Services HT-400 horizontal triplex pump, manufactured by Halliburton Services of Duncan, Okla. Such pumps commonly generate pressures in excess of ten thousand psi, and are on occasion subject to overpressuring for a variety of reasons. Several common causes of overpressure are blockage of a pump discharge line, the erroneous closure of a valve on the discharge side of the pump, or the phenomenon of "sandout."

Sandout may occur during a fracturing job, wherein the producing formation of the well is subjected to high pressures to crack or "fracture" the producing strata. It is common in such fracturing operations to include a proppant, such as glass or ceramic beads, walnut shells, glass microspheres, sintered bauxite, or sand (hereinafter collectively and individually referred to as "sand") in the carrier fluid, so as to provide a means of maintaining the cracks in the fractured producing formation open after the fracturing pressure is released. Present day fracturing operations often employ a foamed carrier fluid using nitrogen or carbon dioxide as the gaseous phase of the foam, in order to lower the volume and cost of the chemicals required and in many cases to avoid a large hydrostatic force on a weak formation, such as is often encountered in gas wells. There has also recently been a marked tendency to load up the carrier liquid with as much sand as possible prior to foaming, in order to further lower fluid volume requirements and hence job costs to the customer. Such concentrations may reach and exceed sixteen pounds of sand per gallon of carrier fluid. These high sand concentrations impose severe performance demands on the blender, manifold and pump systems due to the erosive effect of the sand and the tendency of slugs of sand to collect in valves, elbows, and in the fluid ends of the high pressure pumps. The collection of sand in these areas is dependent upon a number of parameters, including gravity, fluid flow rate, rheological properties of the carrier fluid, physical properties of the sand and the geometry of the system as a whole.

However, regardless of causation, the concentration of sand associated with a sandout in the fluid end of a high pressure pump can result in sudden overpressuring of the fluid end with resulting damage to one or more of the plunger, connecting rod, crankshaft, or other parts of the pump drivetrain. The overpressuring due to sandout is particularly destructive as the resulting force may be eccentrically applied to the plunger and fluid end, as a slug of sand often collects at the bottom of the plunger, as has been observed.

It has been known in the art to attempt to alleviate this sandout problem with ball type valves in the pumps. However, such valves are susceptible to clogging due to the sand content of the carrier liquid, and may also fail to reclose after the problem is corrected due to the presence of sand in the valve, or the erosive effect of the sand-laden carrier fluid.

SUMMARY OF THE INVENTION

The present invention comprises a retainer assembly secured to the fluid end of a pump behind a protective cover inserted in each cylinder of the fluid end. The protective cover, as disclosed and claimed in co-pending U.S. application Ser. No. 575,635 filed on even date herewith and assigned to the assignee of the present invention, is substantially circular in configuration, and includes a shear disc surrounded by an annular outer portion, with an arcuate boundary of substantially reduced wall thickness therebetween. When subjected to a load in excess of the shear strength of the arcuate boundary, the shear disc shears at its boundary with the outer portion of the cover and is propelled outwardly by the pressure in the fluid end to strike a plug which is backed by an impact disc which is located at the outer end of the retainer assembly of the present invention. The outer end of the retainer assembly includes a substantially circular recess therein of lesser diameter than the impact disc. The impact disc is sheared by the edge of the recess, the energy from the center portion of the cover being thereby substantially dissipated in the process, thereby avoiding harm to the retainer assembly. The fluid end of the pump, the plunger, connecting rod, crankshaft, etc. are protected from harm by the venting of the overpressure occurring upon shearing of the shear disc. After the retainer assembly, the outer portion of the cover and the sheared shear disc are removed from the fluid end, the sand is cleared from the fluid end (if sandout is the cause of the overpressure), a new protective cover and impact disc may be installed, the retainer assembly secured to the fluid end, the pump restarted and the fracturing operation recommenced.

BRIEF DESCRIPTION OF THE DRAWINGS

The apparatus of the present invention will be more fully understood by one of ordinary skill in the art through a reading of the following detailed description of a preferred embodiment thereof, taken in conjunction with the accompanying drawings, wherein.

DETAILED DESCRIPTION AND OPERATION OF A PREFERRED EMBODIMENT

Figure 1:
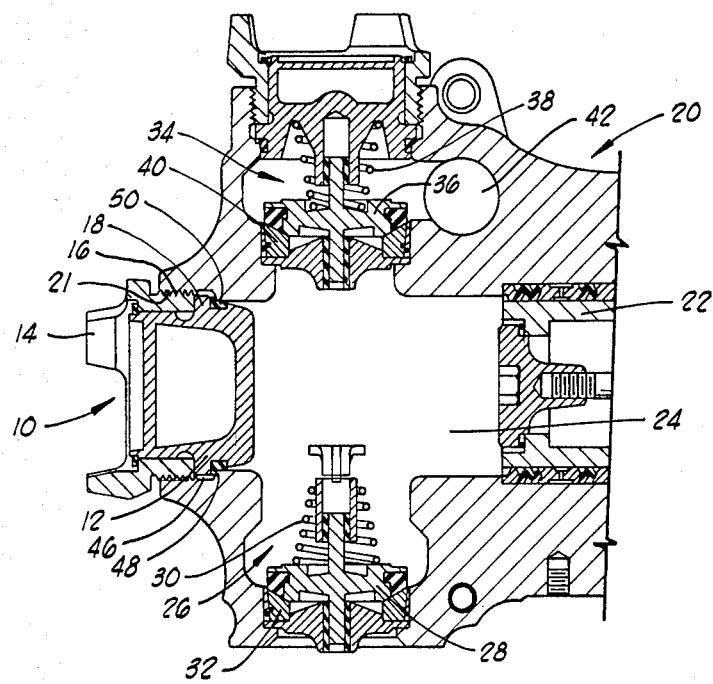
FIG. 1 is a horizontal sectional elevation of a portion of the fluid end of a plunger-type pump employing a cylinder cover of the prior art type.
Figure 2:
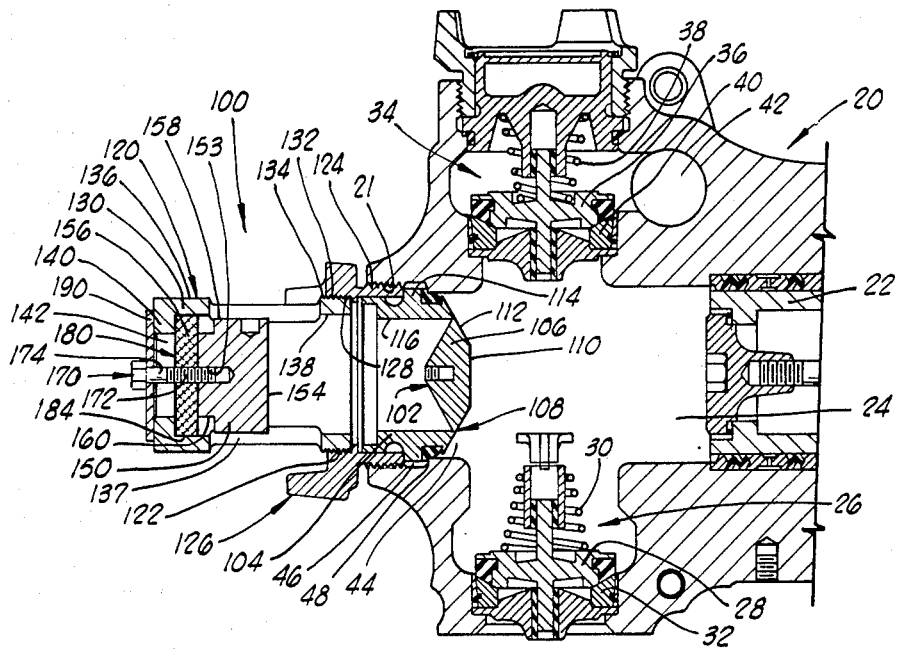
FIG. 2 is a view similar to FIG. 1, but with the retainer assembly of the present invention employed.

FIGS. 1 and 2 will be referred to in the following detailed description of the retainer assembly of the present invention.

The prior art type of fluid end cover 10 is illustrated in FIG. 1, denoted "Prior Art." Fluid end cover 10 includes a cylindrical plug 12 secured in fluid end 20 by retainer 14 which is secured by threads 16 to threads 21 of fluid end 20. Annular shoulder 18 on cover 12 is clamped between fluid end 20 and retainer 14, shoulder 18 actually abutting wear ring 48 inserted in fluid end recess 46 in front of plug 12. Elastomeric seal 50, carried on plug 12 provides a fluid-tight seal between plug 12 and the periphery of fluid end recess 46. As can readily be seen, plug 12 is substantially coaxial with pump plunger 22 in cylinder 24. There is, of course, one such plug 12 at the end of each cylinder 24 of fluid end 20. At the bottom of FIG. 1 is suction valve assembly 26, including inlet valve 28 which is biased by spring 30 against valve seat 32. At the top of FIG. 1 is outlet valve assembly 34 including outlet valve 36 which is biased by spring 38 against valve seat 40. In normal pump operation, fluid enters cylinder 24 through suction valve assembly 26 by the withdrawal of plunger 22 from cylinder 24, after which the fluid in cylinder 24 is raised in pressure by the advance of plunger 22 toward plug 12 in cylinder 24, the fluid then exiting from cylinder 24 into outlet passage 42 through outlet valve assembly 34. As this type of plunger pump and its operation are well known in the art, no further explanation will be given thereof, nor of the drive means for plunger 22, such drive means being also well known in the art.

It should be noted that, in the event of an overpressure in cylinder 24 due to one of the aforementioned causes, the prior art plug 12 and retainer 14 offer no means of venting the overpressure, resulting in possible damage to fluid end 20, plunger 22, or parts of the drivetrain to plunger 22, such as a connecting rod or the pump crankshaft (not shown).

The preferred embodiment of the present invention is illustrated in FIG. 2, inserted in the end of cylinder 24 of fluid end 20 in lieu of cover 10 of the prior art. Protective cover and retainer assembly 100 includes a cup-shaped cover 102 having a cylindrical outer portion 104 and a circular inner shear disc 106 with arcuate boundary 108 of reduced wall thickness therebetween. The inner end of shear disc 102 has a flat circular end face 110 surrounded by an oblique annular face 112. The exterior of outer portion 104 includes annular flange 114, which is of greater diameter than that of outer end 44 of cylinder 24, but less than that of fluid end recess 46 which communicates with cylinder 24. The outer end of fluid end recess 46 is threaded at 21, as previously noted. The inner wall 116 of outer portion 104 is of substantially constant diameter.

Cover 102 is maintained in fluid end 20 by the insertion of retainer assembly 120 of the present invention into fluid end 20 and the making up of threads 124 on cover retainer 122 of retainer assembly 120 to threads 21. Flange 114 is clamped between retainer assembly 120 and fluid end 20, wear ring 48 being disposed between flange 14 and fluid end 20. Cover retainer 122 further includes hammer lugs 126 on its exterior, by which cover retainer 122 may be tightly threaded to fluid end 20 by a sledge hammer, as is commonly used in petroleum industry field operations. The interior of cover retainer 122 possesses threads 128 thereon, which engages threads 132 on catcher 130. Catcher 130 is preferably welded to cover retainer 122 by an annular weld at 134. Catcher 130 is cup-shaped, and possesses a substantially uniform outer surface 136 contiguous to threads 132, surface 136 being pierced by a plurality of longitudinal slots 137 extending to interior wall 138, which is also of substantially uniform diameter. The "bottom" 140 of the cup of catcher 130 is pierced by axially disposed aperture 142. Shear plug 150 is disposed in the interior of catcher 130 on the end of hex cap screw 170, threads 172 on the body 174 of which engage threads 153 on the interior of axially extending cavity 152 of shear plug 150. Inner end 154 of shear plug 150 is radially flat, as is outer end 156. The exterior of shear plug 150 is stepped, cylindrical surface 158 being of slightly lesser diameter than that of catcher inner wall 138, and smaller cylindrical surface 160 being of slightly lesser diameter than that of axially-disposed aperture 142. Circular impact disc 180 is disposed within catcher 130 between shear plug 150 and the "bottom" 140 of catcher 130, hex cap screw extending through an axial hole (unnumbered) therein into shear plug 150. The perimeter 184 of impact disc 180 is of slightly lesser diameter than that of inner wall 138, while both radially extending faces of shear disc 180 are flat. The head 176 of hex cap screw 170 is maintained outside catcher 130 by plug washer 190, through which screw body 174 extends into impact disc 180 and shear plug 150. When hex cap screw 170 is made up tightly to shear plug 150, the bottom 140 of catcher 130 is clamped between plug washer 190 and impact disc 180.

It should be understood that protective cover and retainer assembly 100 may be employed at the end of each cylinder 24 in a multi-cylinder pump, such as the HT-400 horizontal triplex pump employed by Halliburton Services of Duncan, Okla., in well servicing operations, in lieu of the prior art type covers. The positioning of all the elements of a protective cover and retainer assembly 100, when installed in a fluid end 20, are as depicted in FIG. 2.

Figure 3:
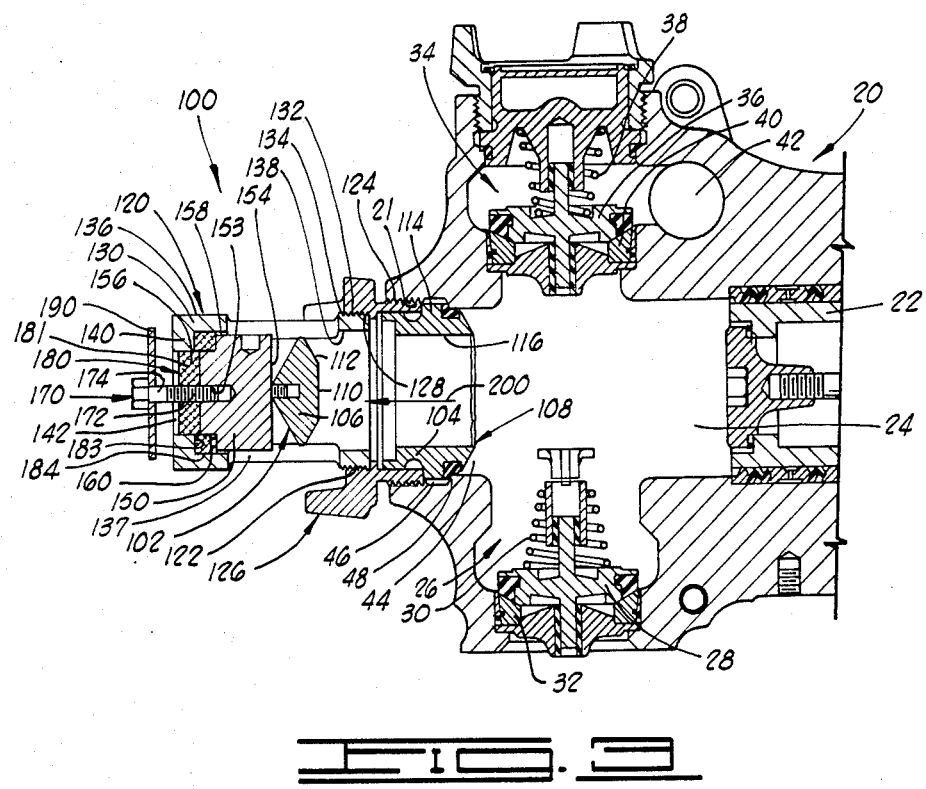
FIG. 3 is a view similar to FIG. 2, but showing the results of overpressuring of a cylinder in the fluid end when the present invention is employed.

When a fluid end 20 equipped with one or more protective cover and retainer assemblies 100 is subjected to overpressure, the pressure is vented from the overpressured cylinder or cylinders 24 as shown in FIG. 3.

When the pressure in cylinder 24 exceeds the design shear load of arcuate boundary 108, shear disc 106 of protective cover 102 is sheared from outer portion 104 and is propelled outwardly as shown by arrow 200 in FIG. 3. As inner wall 116 of outer portion 104 and interior wall 138 of catcher 130 are both of greater diameter than center portion 106, shear disc 106 will strike shear plug 150, which is backed by impact disc 180. As aperture 142 in catcher bottom 140 is of lesser diameter than that of impact disc 180, the edge of aperture 142 will serve as a cutting edge on which a center portion 181 of impact disc 180 is sheared from an annular outer portion 183, the outer end 156 of shear plug 150, bounded by smaller cylindrical surface 160, concentrating the force of shear disc 106 at the edge of aperture 142. As impact disc 180 shears, hex cap screw 170 with washer 190 is moved outwardly, as shown in FIG. 3. Pressurized fluid in cylinder 24 is safely vented upwardly and downwardly through slots 137.

After the kinetic energy of shear disc 106 is dissipated, it will fall downwardly and be retained in catcher 130.

In order to prepare the fluid end 20 of the pump for service after an overpressure, each retainer assembly 120 of the present invention which has vented is backed off from fluid end 20, shear disc 106 and outer portion 104 of protective cover 102 are discarded, hex cap screw is backed off from shear plug 150, sheared center and outer portions 181 and 183 of impact disc discarded. A new (unsheared) impact disc 180 is provided, new impact disc 180 reassembled with catcher 130, shear plug 150, hex cap screw 170 and washer 190 as shown in FIG. 2, a new (unsheared) protective cover is provided and inserted with a wear ring 48 and seal 50 into each cylinder 24 of fluid end 20 which was previously vented, and retainer assembly 120 threaded into fluid end 20 behind protective cover 102.

If the overpressure in cylinder 24 is caused by sand-out, the shearing of shear disc 106 may be eccentric, and center portion 106 may not strike shear plug 150 squarely. However, the force will still be transmitted to shear disc 180, and may in fact be less than in an instance of uniform shear, as part of the pressure may be vented to the atmosphere rather than acting as a propellant for shear disc 106.

It will be understood by one of ordinary skill in the art that all of the protective cover and retainer assembly 100 may preferably be fabricated from a suitable steel such as AISI 4140, with the exception of impact disc 180 which preferably comprises aluminum, bronze, or other suitable relatively soft and readily shearable material to effectively absorb the energy of shear disc 106. It will also be understood that the protective cover 102 should be designed to fail (shear disc 106 shear) at or less than the design plunger load, in order to prevent damage to the plunger 22 and the pump drivetrain.

In addition to design for failure at a certain predetermined load, the protective cover employed with the present invention must possess an adequate fatigue life at the rated pressure of the pump in which it is employed, in order to avoid frequent replacement of the cover and/or unexpected failures due to fatigue. Ideally, the maximum plunger force effecting cover failure (shear) would be only slightly higher than the maximum force generated during normal pump operations. However, such an approach would result in an unacceptably short fatigue life. In order to obtain an acceptable fatigue life of 300,000 plunger cycles, the maximum plunger force for cover failure is much higher. For example, in a pump employing a 4½" plunger and a normal maximum operating pressure of approximately 11,000 psi, the plunger pressure required for failure of a cover having a 300,000 cycle fatigue life is about 18,000 psi. Accordingly, taking into account the geometry of the protective cover 102, including the diameter of shear disc 106, and circumferential length of arcuate boundary 108, as well as the hardness of the cover material employed, an appropriate wall thickness for arcuate boundary 108 may readily be selected by one of ordinary skill in the art.

Thus, it is apparent that a novel and unobvious retainer assembly has been invented. While the invention has been disclosed in terms of a preferred embodiment, the spirit and scope of the invention is not so limited. For example, the present invention need not be employed in coaxial relationship to a pump plunger, and may be fabricated with a greater or fewer number of components than employed in the preferred embodiment. In addition, other configurations other than circular may be employed in impact disc 180 to absorb the kinetic energy of the shear disc 106, the impact disc 180 might be placed closer to the unsheared shear disc, the retainer assembly may be secured to the fluid end by means other than threads, etc. These and other additions, deletions and modifications will be evident to one of ordinary skill in the art.

Furthermore, while the retainer assembly of the present invention has been shown to have utility in well fracturing operations, it should be understood that its utility is not so limited. The present invention may be employed in high pressure plunger-type pumps of every nature, whatsoever their use may be, in order to prevent damage to the pump and components thereof and injury to personnel from overpressures relieved by a protective cover.

I claim:

1. A retainer assembly adapted for use with a protective cover for a fluid end of a plunger-type pump adapted to relieve pressure in a cylinder of said pump when said pressure exceeds a predetermined limit, said cover being in fluid communication with said cylinder, said cover including an outer portion; an inner portion circumferentially surrounded by said outer portion; and a boundary comprising an area of reduced wall thickness between said inner and outer portions and adapted to fail above a predetermined pressure in said fluid end; said retainer assembly comprising:

means for securing said retainer to said fluid end; and catcher means adapted to catch said shear disc upon failure of said boundary, said catcher means being cup-shaped and substantially coaxially aligned with said inner portion, the mouth of said cup facing said inner portion and said cup bottom having an aperture therethrough, said catcher further including impact receiving means disposed in said cup proximate said aperture, and shear plug means disposed between said impact receiving means and said inner portion.

2. The apparatus of claim 1, wherein said cup aperture is substantially coaxially aligned with said impact receiving means, said shear plug means and said inner portion.

3. The apparatus of claim 2, wherein said cup aperture is circular, and of lesser diameter than said impact receiving means, and said shear plug means possesses a flat face proximate said impact receiving means, said flat face being defined by a cylindrical outer surface of slightly lesser diameter than that of said cup aperture, whereby said shear plug will force the center portion of said impact receiving means into said cup aperture when impacted by said inner portion after boundary failure, shearing said impact receiving means and thereby substantially dissipating the kinetic energy of said shear disc.

4. A retainer assembly adapted for use with a protective cover for a cylinder of a fluid end of a plunger-type pump, said cover including a center shear disc surrounded by an annular outer portion with an arcuate boundary of reduced wall thickness therebetween, comprising:

a housing having means on the exterior thereof for securing said retainer assembly to said fluid end, a cup-shaped catcher substantially coaxially aligned with said shear disc; and impact receiving means and shear plug means disposed in said catcher in substantial coaxial alignment with said shear disc.

5. The apparatus of claim 4, wherein said cup possesses a round aperture in the bottom thereof, said impact receiving means comprises a disc of greater diameter than said aperture, and said shear plug means includes a stepped face thereon proximate said impact receiving disc defined by a cylindrical exterior surface of slightly lesser diameter than said cup aperture.

6. A method of preventing overpressure in a fluid end of a plunger-type pump, comprising:

providing an aperture in said fluid end in communication with at least one cylinder in said fluid end and the exterior of said pump;

sealingly blocking said aperture with a protective cover including first outer and second inner portions adapted to separate along a predetermined boundary above a predetermined pressure limit;

securing said cover in said aperture;

operating said pump whereby pressure in said at least one cylinder exceeds a predetermined pressure limit, whereby said first and second portions of said cover separate along said boundary and said pressure is vented to the exterior of said pump;

catching said second inner portion of said cover proximate said fluid end after separation thereof from said first outer portion; and dissipating the kinetic energy of said second inner portion of said cover after said second inner portion is caught.

7. The method of claim 6, including providing an aperture in each cylinder of said fluid end, and sealingly blocking each aperture with a protective cover.

8. The method of claim 6, wherein said step of dissipating comprises at least deforming of an impact receiving means subsequent to said catching.

9. The method of claim 6, wherein said step of dissipating comprises shearing an impact receiving means subsequent to said catching.

* * * * *